United States Patent [19]

Singh

[11] Patent Number: 5,840,797
[45] Date of Patent: Nov. 24, 1998

[54] LIGHT WEIGHT, HIGH PERFORMANCE VIBRATION-DAMPING SYSTEM

[75] Inventor: Raj V. Singh, Vandalin, Ohio

[73] Assignee: H. B. Fuller Licensing & Financing, Inc., St. Paul, Minn.

[21] Appl. No.: 714,657

[22] Filed: Sep. 16, 1996

[51] Int. Cl.$^6$ .............................. C08K 3/04; C08K 7/28; C08J 9/32; C08L 57/02
[52] U.S. Cl. .......................... 524/495; 523/218; 523/219; 523/223; 524/271; 524/274; 524/499; 524/549; 524/574
[58] Field of Search .................................. 523/218, 219, 523/223; 524/271, 274, 495, 499, 574, 549

[56] References Cited

U.S. PATENT DOCUMENTS

| | | | |
|---|---|---|---|
| 4,440,829 | 4/1984 | Gerace et al. | 428/343 |
| 4,581,281 | 4/1986 | Gerace | 428/251 |
| 4,699,810 | 10/1987 | Blakeman et al. | 427/244 |
| 4,734,323 | 3/1988 | Sato et al. | 428/317.7 |
| 4,783,366 | 11/1988 | Shimogo et al. | 524/271 |
| 5,153,254 | 10/1992 | Chen | 524/505 |
| 5,300,577 | 4/1994 | DiRossi et al. | 525/237 |
| 5,324,758 | 6/1994 | Takahashi et al. | 524/59 |
| 5,578,680 | 11/1996 | Ando et al. | 525/131 |

FOREIGN PATENT DOCUMENTS

| | | | |
|---|---|---|---|
| 000151 | 1/1989 | Japan | 523/218 |
| 146562 | 6/1991 | Japan | 523/218 |
| 146564 | 6/1991 | Japan | 523/218 |
| 178443 | 6/1992 | Japan | 523/218 |
| 224841 | 8/1992 | Japan | 523/218 |

*Primary Examiner*—Peter A. Szekely
*Attorney, Agent, or Firm*—Carolyn A. Fischer; Lisa L. Ryan; Nancy N. Quan

[57] ABSTRACT

A light weight, vibration-damping composition having effective amounts of at least one butyl rubber, at least one tackifying resin, at least one pigment and substantially spherical microspheres is disclosed. The present composition has a specific gravity of about 1.0 to 1.2 and has effective damping effects at low temperatures as well as temperatures up to about 60° C. This composition is effective for use in the transportation industry, the building industry, the aerospace industry and the appliance industry.

12 Claims, 6 Drawing Sheets

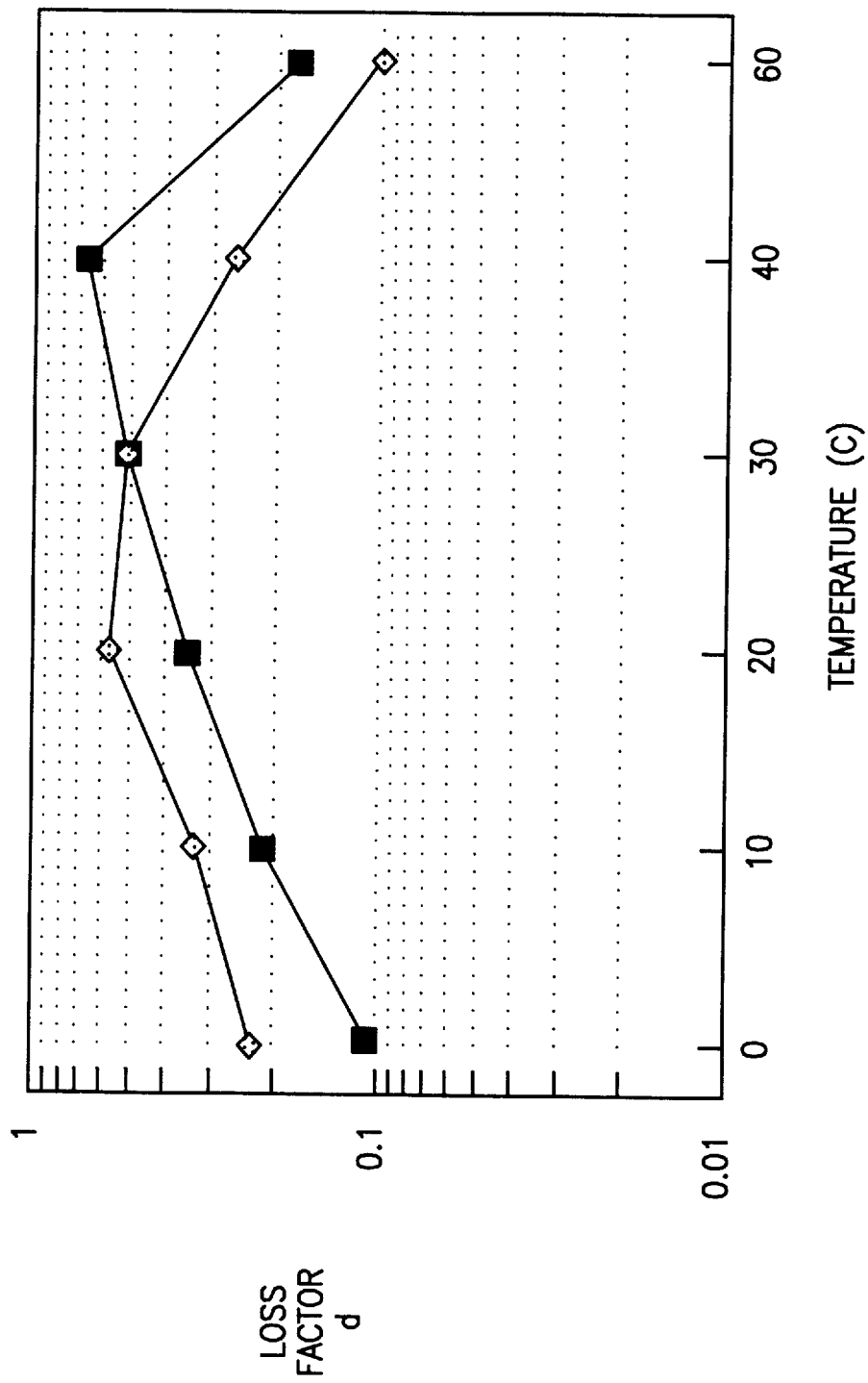

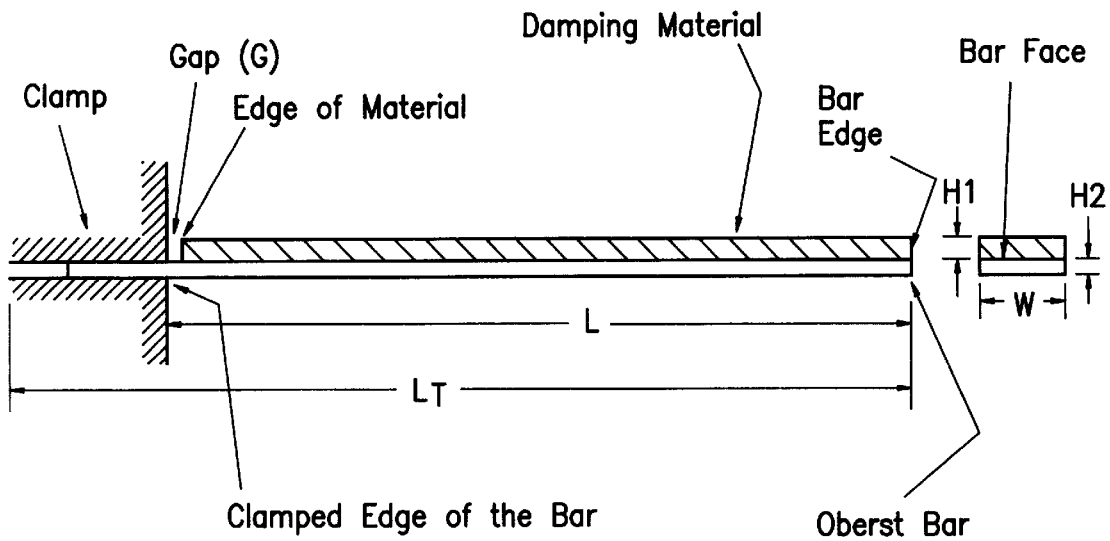

LEGEND:

L = Free length of the bar: 200 mm
(This is also the length of the damping material)
L = Total length of the bar: 225 mm
H1 = Thickness of the damping material
H2 = Thickness of the bar: 0.8 mm
W = Width of the bar: 12.7 mm

NOTE:

The damping material should not touch the clamping mechanism or the test fixture. The gap (G) between the clamping device and the material should be less than or equal to 1 mm.

FIG. 6

LIGHT WEIGHT, HIGH PERFORMANCE VIBRATION-DAMPING SYSTEM

BACKGROUND OF THE INVENTION

1. Field of the Invention

The present invention relates to a light weight, high performance vibration-damping system. More specifically, the present invention relates to a light weight, elastomeric, butyl, mastic composition which when laminated to a film, provides superior damping properties.

2. Description of Related Art

There is an ever growing need to produce efficient and effective structures. This need, coupled with a desire and increasing demand to conserve energy has created light weight structures that move and/or vibrate at faster speeds, producing higher temperatures and thus creating higher acoustics and undesirably higher levels of vibration. This in turn has necessitated the search for better vibration-damping materials.

It has been known that component parts in devices and structures that vibrate under the influence of an applied internal or external force can be substantially reduced by attaching a layer of viscoelastic material to them. For example, U.S. Pat. No. 3,640,836 discloses a vibration-damping laminate in which the viscoelastic layer is a polymer comprised of ethylene, vinyl acetate and acrylic and/or methacrylic acid. U.S. Pat. No. 3,847,726 discloses yet another viscoelastic adhesive composition of a polyepoxide, a polyether amine, a hetrocyclic amine and a phenol useful as vibration-damping material over a −25° C. to +60° C. range. These compositions disclosed, however, are not effective for vibration-damping over prolonged periods of time and do not provide the required light weight, high performance systems that are desired in this technological age.

The use of rubbers in a composition for the purpose of vibration-damping is also known in the art. JP 90-306255 discloses vibration-dampers and sound insulators containing (a) 100 parts composition containing SBR 25–40, mineral oil 15–40 and carbon black 30–47%, (b) ≦100 parts (reclaimed) rubbers, (c) 100–600 parts (based on 100 parts a+b) inorganic compounds with specific gravity ≧2.5, and (d) 10–100 parts (based on a+b) fine powdered coal. EP 335642 A2 teaches laminated composites suitable for vibration-damping that are manufactured from layers of metal or alloy for support, rubber or a viscoelastic polymer for damping, and hot-melt adhesive for bonding. The laminate structure is useful for improved sound-proofing applications. JP 61005158 B4 discloses sound-insulating and vibration-damping materials having specific gravity >2.5 which are prepared by uniting mixtures of 100 parts rubber with 150–600 parts non-metallic fibers and/or nonmetallic scaly inorganic substances such as asbestos and mica with metal fibers. These compositions, however, again do not provide the light weight, high performance, damping effect necessary for the structures in which the present invention finds use.

There is therefore, generally, a need for a high performance, light weight vibration-damping system that allows the industry, especially the automotive industry, to continue to avail itself of technology that produces lighter and lighter cars. Further, there is a need for a high performance system which will tolerate the temperature ranges of from about 0° C. to about 60° C., yet retaining a high sound damping effect.

BRIEF DESCRIPTION OF THE INVENTION

The present invention discloses a unique composition of high performance, light weight, elastomeric, butyl mastic, that when applied to a substrate, preferably by lamination, generally provides a superior vibration-damping system. The composition comprises a mixture of at least one butyl rubber, at least one tackifying resin, at least one light weight pigment, and substantially spherical particles. The specific gravity of the compositions of the present invention ranges from about 1.0 to about 1.20.

More specifically, the present invention comprises a light weight vibration damping system comprising:

(a) a substrate; and (b) present on at least one surface of said substrate is a light weight vibration damping composition comprising:
  (i) about 10 to about 35 wt-% of butyl rubber;
  (ii) about 5 to about 20 wt-% of tackifying resin;

(c) about 10 to about 30 wt-% of pigment; and (d) about 1 to about 10 wt-% of substantially spherical microspheres.

The specific gravity of the compositions of the present invention ranges from about 1.00 to about 1.30.

The system may be used in a number of applications, including the transportation industry, the building industry, the aerospace industry and the appliance industry. The applications in the transportation industry generally include those parts of the vehicle which are subject to high vibration levels including the quarter panels, roofs, doors, interior, floor pan and wheel house.

The present invention may also include optional ingredients to further customize the specific properties needed or desired. These can include various kinds of fillers and compatible plasticizers such as polybutenes and fatty acids.

Also included within the scope of this invention is the process of extruding the butyl mastic compositions of the present invention at a thickness of about 1.0 to about 3.0 mm onto a release liner and then laminating the butyl mastic composition to a suitable substrate, such as aluminum foil, mylar, polyolefin film or steel. This process may also be reversed so that the butyl mastic is extruded unto the substrate and then laminated with the release liner. The thickness of the substrate should be about 50 to about 150 microns.

The vibration damping properties are measured by loss factors, and generally range from about 0.09 to about 0.60 at temperatures of 20° C. to 60° C. for the systems of the present invention. The systems of the present invention also perform favorably at low temperatures as well as at high temperatures. The low temperature performance can be further improved if desired by the presence of a surface seal coating. The surface seal coating can be any suitable pressure sensitive adhesive coating such as described in U.S. Pat. No. 4,581,281 incorporated herein by reference.

BRIEF DESCRIPTION OF THE DRAWINGS

FIG. 5 is a plot of the loss factor against temperature for Examples 2 & 4.

FIG. 6 is a description of the damping material used in the damping performance in accordance with the described test method.

DETAILED DESCRIPTION OF THE INVENTION

Figure 1:
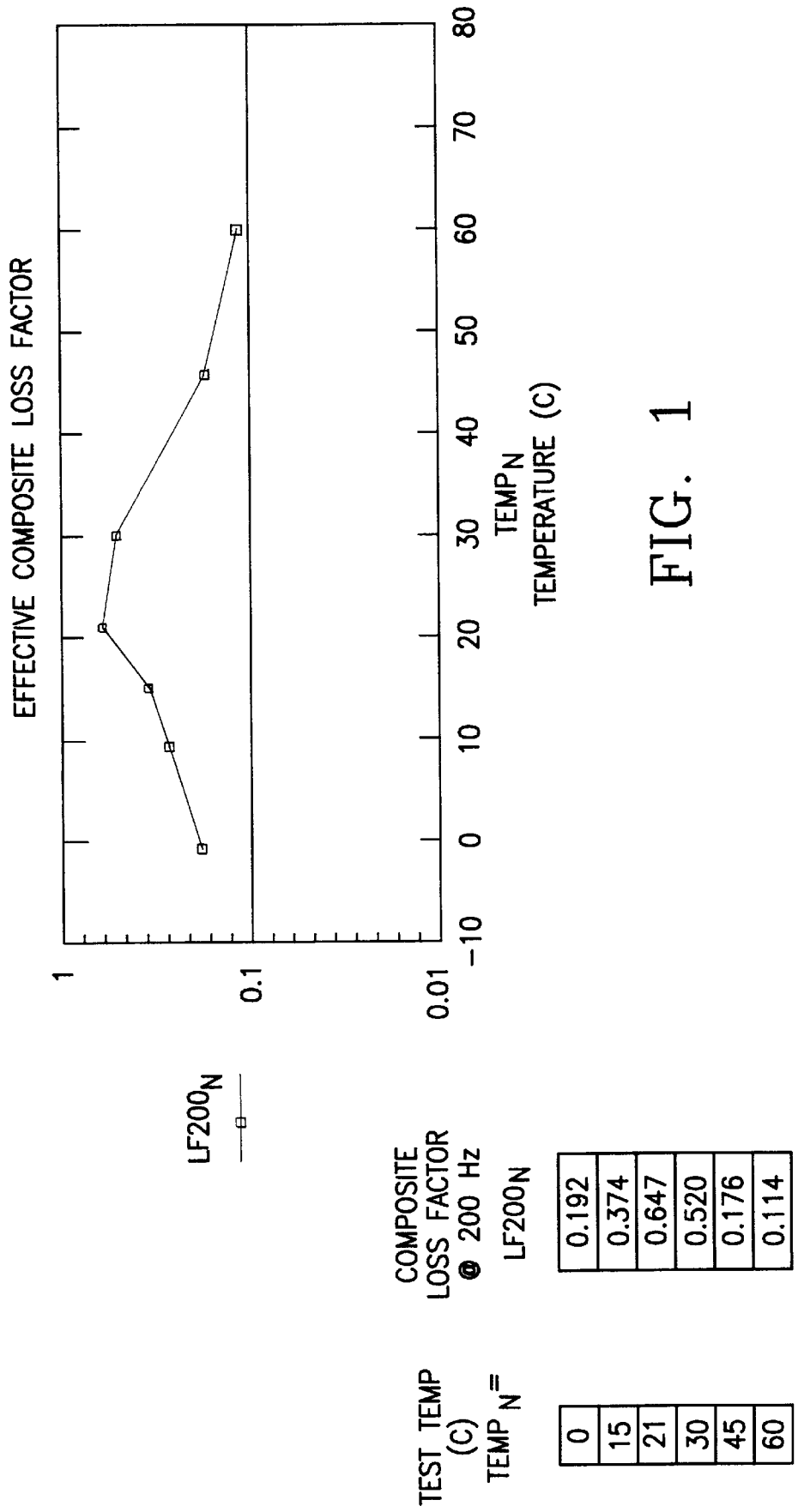
FIG. 1 is a plot of the loss factor against temperature for Example 1.

A unique combination of ingredients has been discovered that advantageously provides desirable vibration-damping properties. When applied to a suitable substrate such as aluminum foil, Mylar, polyolefin film or steel, a light weight vibration damping system is provided. The system can be used in vehicles, such as cars, trucks or boats, appliances or other suitable structures that are subject to noises resulting from high vibrations.

Generally, the system of the present invention finds application in the quarter panels, the roof, the door, the interior, the floor pan, and the wheel house of motor vehicles. In other applications, the system could be placed in a suitable position on the inside or outside of the vehicle, aircraft appliance or structure to provide maximum performance. In use, it has been found that this system has a sound loss factor that is generally two to three times higher than competitive products when tested under identical conditions as the systems of the present invention. Generally, the loss factor values at 30°–40° C. are considered the most important for the automotive industry. The loss factor of prior damping systems are at levels of 0.2 to 0.18. The damping effects of these systems drop to negligible levels at higher temperatures. Cured systems, on the other hand, can produce loss factors up to 0.2 at this temperature range of 30° C. to 40° C., but their performance at lower temperatures is poor. The systems of the present invention have loss factors ranging from about 0.05 to about 0.7 at temperature ranges of from 20° C. to 60° C., more specifically, loss factors of about 0.1 to about 0.6 at temperatures of 20° C. to 60° C., and more specifically, loss factors of about 0.25 to about 0.5 at temperatures of 20° C. to 40° C.. This unprecedented performance can even be achieved at temperatures as low as 0° C.

Even though prior art systems may have utilized some of the components of the present invention in devising their damping systems, the unique combinations of the present invention have never been contemplated. The present inventor believes that the tackifying resin plays a key role in the performance of the system. It is surmised that the tackifying resin, at chosen levels, performs synergistically with the other components of the system to increase the loss factors of the systems to unprecedented levels.

Generally, the compositions of the present invention comprise at least one tackifying resin. There are a variety of tackifying resins that are useful. These include naturally occurring resins and their derivatives, such as aliphatic hydrocarbon resins, rosin and rosin esters, terpene, and coumarone and coumarone-indene. Further, there are synthetic petroleum based resins which can be used either alone or in combination with the naturally derived resins. Tackifying resins are, as their name connotes, generally used to provide tack to compositions. However, in the present invention, they improve the damping effects of the system as well. The preferred tackifying resins of the present invention include those known under the trade designation of "Escorez 1102, 1104, 1310 LC, 1580, 2000 series and 5000 series" from Exxon Chemical (Houston, Tex.) and "Norsolene" from Sartomer Co. (West Chester, Pa.). In the preferred composition, amounts of resins can vary from about 5 to about 20 wt-% with a more preferred amount of from about 5 to about 20 wt-% to a most preferred amount of from about 5 to about 17 wt-%. The vibration damping effect, as measured by the loss factor, increases as the level of tackifying resin increases. However, at levels higher than about 20 wt-%, the system becomes brittle at the low temperature ranges, and thus loses the vibration damping effect. Some of the loss due to brittleness can be compensated by a surface coating. The coating can be any surface seal coating including any suitable pressure sensitive adhesive coating such as described in U.S. Pat. No. 4,581,281 incorporated herein by reference.

The butyl rubbers that are useful in the present invention may differ in grades. These butyl grades differ in moles % unsaturation, molecular weight, and nature of the stabilizer incorporated during manufacture to prevent degradation. These include partially crosslinked butyl rubber, copolymers of isobutylene and isoprene. Examples of butyl rubbers of the present invention include, but are not limited to, those known under the trade designation of "Butyl 065, 165, 268 & 269" from Exxon Chemical (Houston, Tex.), and "Kalar 5215", (Belleville, N.J.). In a preferred composition of the present invention, butyl rubber is present in an amount of about 10 to about 30 wt-%, more preferably in an amount of about 10 to about 25 wt-%, with the most preferred amount of about 15 to about 25 wt-% of the total system.

Substantially spherical microspheres or fine particles are useful in the present invention because of their light weight. They may be useful in providing bulk, controlling viscosity, increasing cohesive strength and so forth. There are various kinds of spheres or microspheres that could find use in the present invention. They include, hollow, substantially spherical, or fine particles of ceramic, polymeric and glass or mixtures thereof. The preferred amounts of microspheres in the present invention are present in an amount of about 1 to about 15 wt-%, more preferably in an amount of about 1 to about 10 wt-%, and most preferably in an amount of about 3 to about 10 wt-%. Examples of suitable fillers include those known under the trade designation "Extendosphere SF" and "Q-CEL" from The PQ Corporation (Valley Forge, Pa.), "Fillite 150 & 100" from Fillite (Atlanta, Ga.), and "Scotchlite Glass Bubbles K Series" from 3M (St. Paul, Minn.).

A pigment or combination of pigments can also be used in the compositions of the present invention to provide color. Among other properties, pigments can also be used to increase the solids content of the compositions and perform the function of a filler. Generally, any alkali stable inorganic or organic pigment can be used in the compositions of the present invention. Examples of useful pigments in the present invention include carbon black and Austin Black™. Austin Black™ is a light weight filler containing 77% carbon. The amount of pigment used in the present invention may vary over a wide range. Preferably, it is present in an amount of about 10 to about 35 wt-%, more preferably in an amount of about 10 to about 30 wt-% and most preferably in an amount of about 15 to about 25 wt-%. Suitable pigments are known under the trade designations of "Special Black™ 100" from Degaussa AG (Frankfurt, Germany), "Austin Black™ 325" from Coal Fillers, Inc. (Bluefield, Va.) and "Regal Black™ 300" from Cabot Corp. (Boston, Mass.).

Optional ingredients can also be added to the compositions of the present invention for further customization of the system. These ingredients will generally be used in amounts that do not adversely alter the desirable properties of the system. Ingredients that may be added include fillers and plasticizers. Although the ingredients used in the present invention may be characterized as useful for specific functions, it should be understood that these ingredients are not limited to their typical functions and thus will be used generally in the present invention to provide desirable properties to the system. For example, pigments may also be useful as fillers and so forth.

In order to obtain certain properties such as crack resistance, water resistance and carbon dioxide barrier effects, platy fillers such as various types of mica which includes mica fractionated mallusk shell and phlogopite mica, talc and clay may be used. Further, it may be advantageous to mix fillers. The preferred amount of filler used in the present invention is from about 15 to about 45 wt-%, with the more preferred amount of from about 20 to about 40 wt-% and most preferably in an amount of from about 25 to about 35 wt-% of the total system. Fillers are available as naturally occurring or as the result of several silicates of varying chemical compositions and are known under the following trade designations, "ROY-CAL-L" from Oyster Shell Products (Mobile, Ala.) "RC-32 clay" from Thiele Kaolin Company (Sandersville, Ga.). "4-K Mica" from KMG Minerals (Kings Mountain, N.C.) and "5000 Series Mica" from Polar Minerals, (Mt. Vernon, Ind.).

Plasticizers are generally used with other resins to obtain tack and cohesive strength. A number of plasticizers can be used in the present invention in order to obtain these desirable properties. Examples of typical plasticizers include polybutene, paraffin oils, tall oil fatty acid, petrolatum and certain phthalates with long aliphatic side chains such as ditridecyl phthalate. Certain plasticizers under the trade designations such as "Parapol 700" and "Parapol 1300" from Exxon Chemicals (Houston, Tex.), "Indopol H-50" and "Indopol H-300" available from Amoco Chemicals (Chicago, Ill.) and "Acintol" from Arizona Chemical (Panama City, Fla.) can be used in the present invention. Preferred amounts of the plasticizer of the present invention are available in an amount of about 10 to about 30 wt-% of the total system, with more preferred and most preferred amounts of about 10 to about 25 wt-% and about 15 to about 25 wt-% respectively of the total system.

The compositions of the present invention can be mixed in a Baker-Perkins sigma blade mixer and extruded onto a release paper and then laminated on a suitable substrate such as foil. The process can also be reversed, i.e., the butyl mastic can be extruded onto the substrate and then the release paper is applied.

The vibration damping properties are generally measured using the Engineering Society for Advancing Mobility Land Sea Air and Space, SAE J1637 test. The test measures the vibration damping performance of a system consisting of a damping material bonded to a vibrating cantilevered steel bar generally known as the Oberst Bar. The test indicates the loss factors at the temperatures the material is subjected to. This test procedure is based on the method described in ASTM E 756 and differs only in that the SAE practice specifies the bar material, the bar size and the mounting conditions of the test sample.

The loss factors of systems of the present invention, as mentioned before, can range from about 0.05 to about 0.70 at temperature ranges of 0° C. to 60° C., more specifically from about 0.10 to about 0.60 at temperature ranges of 20° C. to 60° C.

The following non-limiting examples are set forth to illustrate the present invention.

EXAMPLES

Test Method
1. Vibration damping based on the Engineering Society for Advancing Mobility Land Sea Air and Space, SAE J1637 test.

This method used a steel bar as the test bar. Precision Ground Gage Stock (or also called Precision Ground Flat Stock) bars were used as the Oberst bar. This Oberst bar could be bought commercially or machined from a mild steel bar stock. When the bar was machined, care was taken to ensure that the two faces of the bar were parallel to each other and that the edges and the ends were square with the face of the bar. A new bar was used for each application. The samples tested had a thickness of 2 mm of vibration damping composition on a 100 micron substrate. The dimensions of the bars varied.

Manufacturing Procedure for Example 3

A Baker Perkins mixer was used. Kalar 5215 (182 kg), Butyl 268 (34 kg), Escorez 1102 (136 kg) and 15 kg of polybutene H50 were added to the mixer and mixed for 30 minutes with the cooling water turned on in the Jacket. Next, Austin Black 325 (228) was added in increments of 45 kg for the next 30 minutes. Then FA-2 oil (3 kg) was added and followed by 4 K mica (91 kg), RC-32 Clay (114 kg), Roy Cal L (45 kg) and Polybutene (234) kg) in increments while maintaining high shear action (or masticating action). The entire mixture was mixed until the homogeneous mastic was achieved. Microspheres (45 kg) was added next and was mixed for 15 minutes. Through the entire process, temperature was maintained below 250° F. Total mix time was 3–4 hours. Quality control test was made using needle penetration hardness test and then talc (23 kg) was added to the mixer to break up the butyl mastic into smaller chunks so that it could be easily removed from the mixer. A similar procedure was followed for other examples.

|  | Example 1 | Example 2 | Example 3 | Example 4 |
|---|---|---|---|---|
| Butyl 268 | 1.5 |  | 3.10 |  |
| Kalar 5215 | 17.38 | 21.70 | 16.48 | 19.39 |
| Polybutene H50 | 8.36 | 18.32 | 20.39 | 16.36 |
| Austin Black 325 | 20.9 | 21.90 | 20.6 | 21.35 |
| Escorex 1102 | 14.00 | 7.97 | 12.36 | 16.0 |
| RC 32 Clay | 8.36 | 9.97 | 10.30 | 8.90 |
| Roy-cal-L | 8.36 | 1.99 | 4.12 | 1.78 |
| 4K Mica | 8.36 | 7.96 | 8.24 | 8.90 |
| FA-2 Oil | .25 | .24 | .29 | .21 |
| Indopol H-300 | 8.36 |  |  |  |
| Talc | 4.18 | 1.99 |  |  |
| Fillite 150 |  | 7.96 | 4.12 | 7.10 |

The samples were tested for damping performance according to the test method described Supra. The dimensions of the bars used were as follows:

| Examples | Dimensions |
|---|---|
| Mounted Free Length | 200 mm ± 0.5 mm |
| Total Length | 225 mm |
| Thickness | 0.8 mm ± 0.03 mm; |
| Width | 12.7 mm ± 0.03 mm. |

Figure 2:
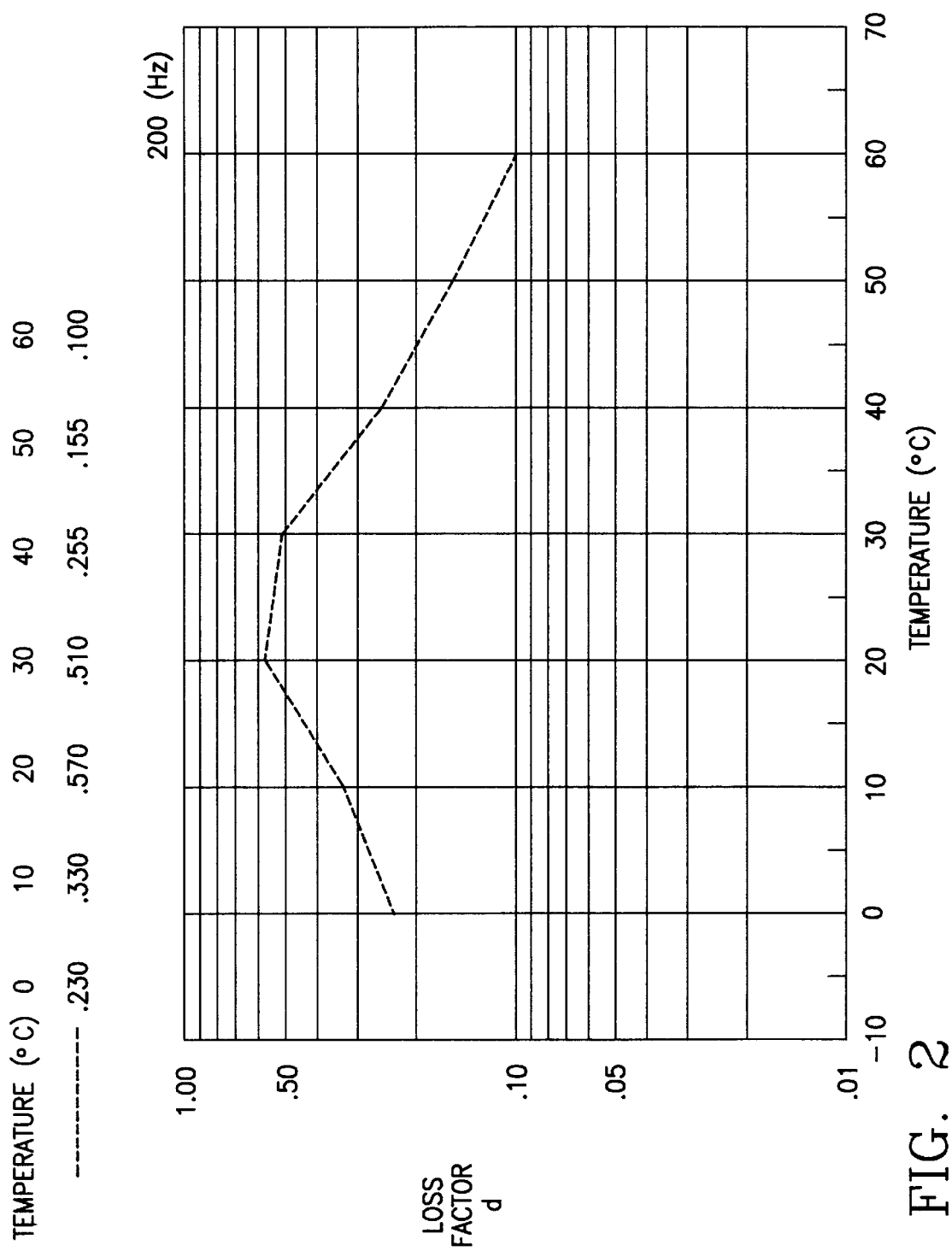
FIG. 2 is a plot of the loss factor against temperature for Example 2.
Figure 3:
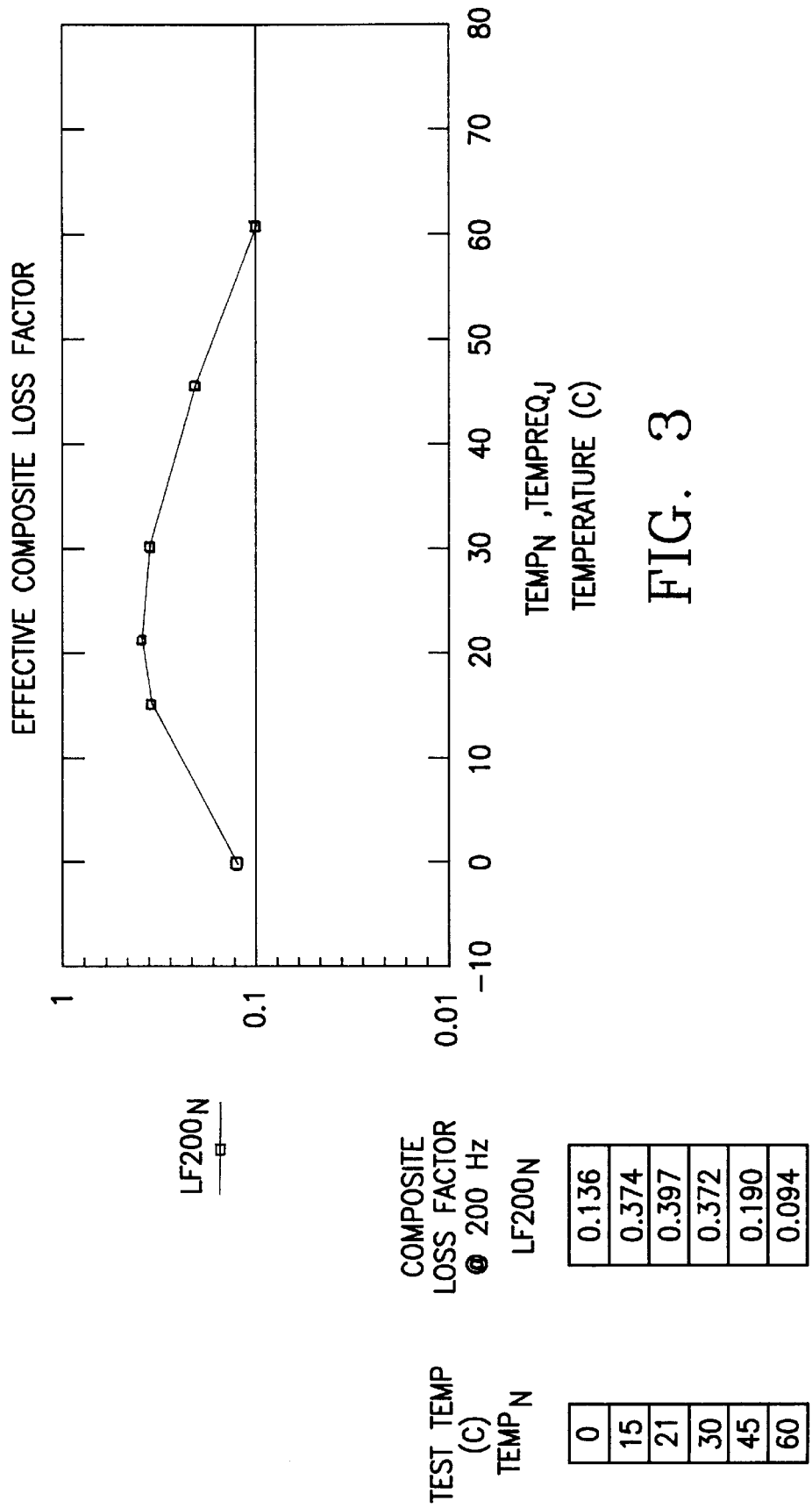
FIG. 3 is a plot of the loss factor against temperature for Example 3.
Figure 4:
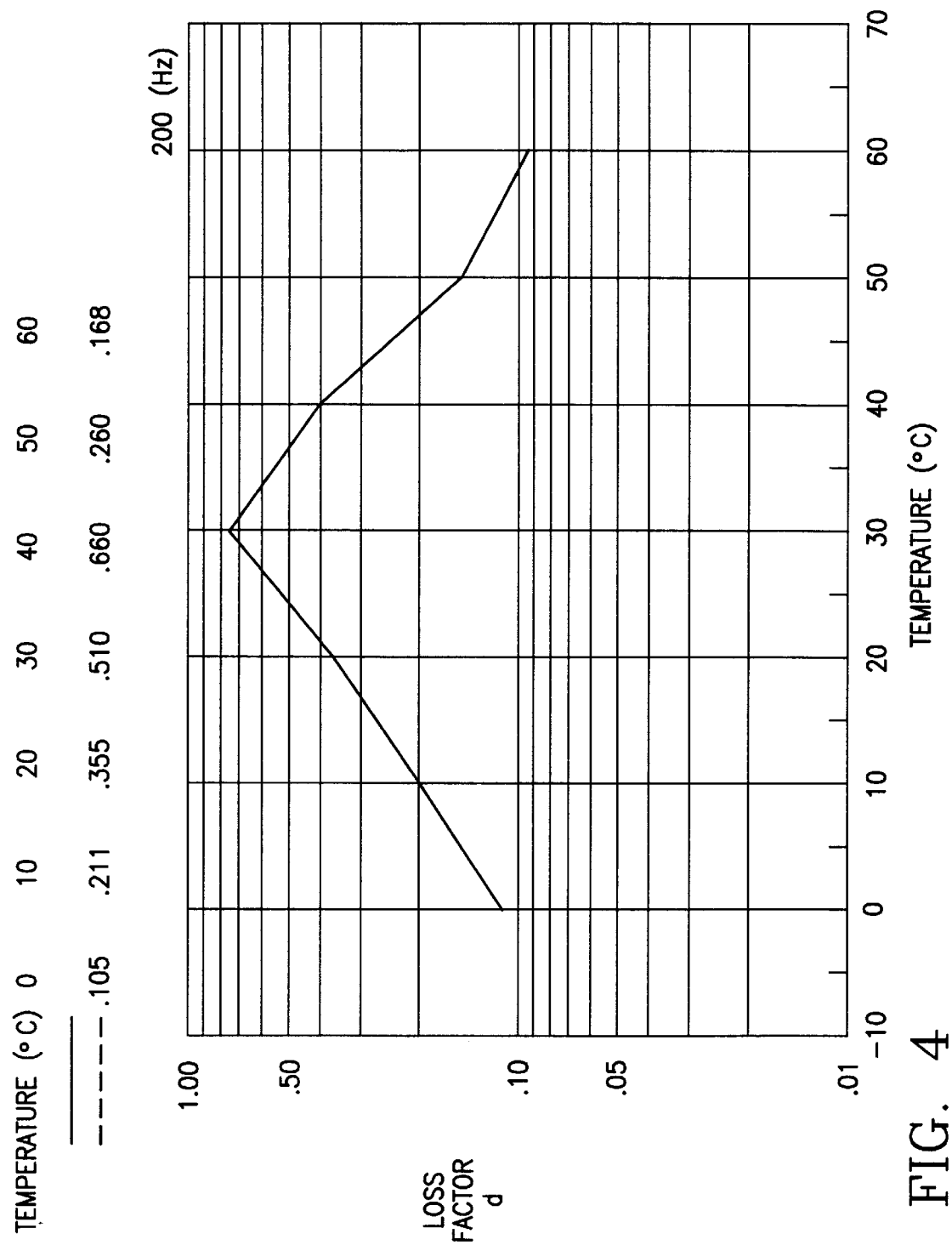
FIG. 4 is a plot of the loss factor against temperature for Example 4.

SAE J1637 test results are shown in the following table:

| COMPOSITE LOSS FACTOR VS TEMPERATURE @ 200 HZ | | | | | | | | | | |
|---|---|---|---|---|---|---|---|---|---|---|
| TEMP C. | 0 | 10 | 15 | 20 | 30 | 40 | 45 | 50 | 60 | Sp. Gr. |
| Example 1 (FIG. 1) 172–116 (butyl-2.0 mm Al.-100 micron) | 0.192 | — | 0.374 | 0.647 | 0.520 | — | 0.250 | — | 0.114 | 1.30 |
| 1A - 172–116 (butyl-1.5 mm Al. - 75 micron) | 0.101 | — | 0.283 | 0.451 | 0.477 | — | 0.215 | — | 0.097 | 1.26 |
| Example 2 (FIG. 2) 172–165 (butyl-2.00 mm Al.-100 micron) | 0.230 | 0.330 | — | 0.570 | 0.510 | 0.255 | — | 0.155 | 0.100 | 1.22 |
| Example 3 (FIG. 3) (butyl-2.00 mm Al.-100 microns) | 0.130 | — | 0.263 | 0.427 | 0.404 | — | 0.227 | — | 0.093 | 1.28 |
| Example 4 (FIG. 4) 172–199' (butyl-2.00 mm Al.-100 micron) | 0.105 | 0.211 | — | 0.355 | 0.510 | 0.660 | — | 0.260 | 0.168 | 1.25 |
| 4A - 172–199 (butyl-1.7 mm Al.-100 micron) | 0.148 | — | 0.383 | — | 0.331 | — | 0.139 | — | 0.070 | 1.28 |
| 4B - 172–199 (butyl-2.00 mm Al. 75 micron) | 0.159 | — | 0.393 | — | 0.372 | — | 0.159 | — | 0.082 | 1.25 |

NOTE:
1A is the same composition as Example 1. 4A and 4B are the same composition as Example 4.

I claim:

1. A light, uncured, elastomeric, vibration damping composition comprising:

(a) at least one butyl rubber;

(b) at least one tackifying resin present in an amount effective for improving the vibration damping effect of the composition; at least one black pigment being present in an amount effective for providing and increasing the solids content of the composition, wherein the pigment is a lightweight filler having a specific gravity of less than or equal to 1.31;

(d) substantially spherical microspheres being present in an amount effective for controlling the viscosity and increasing the cohesive strength of the composition;

wherein said composition is uncured and having a specific gravity of about 1.00 to about 1.20.

2. The vibration-damping composition of claim 1 wherein the tackifying resin is present in an amount of from about 5 to about 20 wt-% of the total composition.

3. The vibration-damping composition of claim 1 wherein the tackifying resin is an aliphatic hydrocarbon resin.

4. The vibration-damping composition of claim 1 wherein the butyl rubber is present in an amount of about 10 to about 30 wt-% of the total composition.

5. The vibration-damping composition of claim 1 wherein the pigment is present in an amount of about 10 to about 35 wt-% of the total composition.

6. The vibration-damping composition of claim 1 wherein the substantially spherical microspheres are selected from the group consisting of spherical micro-balloons and particles of ceramic, polymeric and glass, and mixtures thereof.

7. The vibration-damping composition of claim 6 wherein the substantially spherical microspheres are present in an amount of about 1 to about 15 wt-% of the total composition.

8. The vibration-damping composition of claim 1 further comprising an ingredient selected from a group consisting of fillers, plasticizers and mixtures thereof.

9. A vibration-damping composition of claim 1 wherein the fillers are selected from the group consisting of mica, clay, pulverized mollusk shell and mixtures thereof.

10. The vibration-damping composition of claim 1 wherein the plasticizer is selected from the group consisting of polybutene, fatty acids and mixtures thereof.

11. The vibration-damping composition of claim 1 wherein the butyl rubber is selected from the group consisting of different grades of butyl rubber, partially crosslinked butyl rubber, and copolymers of isobutylene and isoprene.

12. The vibration damping composition of claim 1, capable of being applied to a substrate selected from the group consisting of aluminum foil, mylar, polyolefin film and steel.

* * * * *